US008887005B2

(12) United States Patent
Sutardja et al.

(10) Patent No.: US 8,887,005 B2
(45) Date of Patent: Nov. 11, 2014

(54) CACHING SYSTEM WITH REMOVABLE MEMORY CARD

(75) Inventors: Pantas Sutardja, Los Gatos, CA (US); Abhijeet P. Gole, Cupertino, CA (US)

(73) Assignee: Marvell World Trade Ltd. (BB)

( * ) Notice: Subject to any disclaimer, the term of this patent is extended or adjusted under 35 U.S.C. 154(b) by 148 days.

(21) Appl. No.: 13/596,489

(22) Filed: Aug. 28, 2012

(65) Prior Publication Data
US 2013/0067286 A1    Mar. 14, 2013

Related U.S. Application Data

(60) Provisional application No. 61/534,683, filed on Sep. 14, 2011.

(51) Int. Cl.
| | |
|---|---|
| *G06F 11/00* | (2006.01) |
| *G06F 11/14* | (2006.01) |
| *G06F 12/08* | (2006.01) |
| *G06F 11/07* | (2006.01) |
| *G06F 11/16* | (2006.01) |
| *G06F 11/20* | (2006.01) |

(52) U.S. Cl.
CPC ........ *G06F 12/0868* (2013.01); *G06F 11/1428* (2013.01); *G06F 11/20* (2013.01); *G06F 11/073* (2013.01); *G06F 11/1666* (2013.01); *G06F 11/076* (2013.01)
USPC ........................................................ 714/47.1

(58) Field of Classification Search
CPC . G06F 11/20; G06F 12/0868; G06F 11/1666; G06F 11/1658; G06F 11/00; G06F 11/1458; G06F 11/1456; G06F 11/1461

USPC .......................................................... 714/1–57
See application file for complete search history.

(56) References Cited

U.S. PATENT DOCUMENTS

| | | | | |
|---|---|---|---|---|
| 6,754,854 | B2 * | 6/2004 | Kurrasch | 714/47.2 |
| 7,302,579 | B1 * | 11/2007 | Cain et al. | 713/182 |
| 8,041,895 | B2 * | 10/2011 | Kern | 711/128 |
| 2003/0226090 | A1 * | 12/2003 | Thayer | 714/763 |
| 2007/0088914 | A1 * | 4/2007 | Soman et al. | 711/115 |
| 2009/0063711 | A1 * | 3/2009 | Finkelstein | 710/3 |
| 2012/0054427 | A1 * | 3/2012 | Huang et al. | 711/108 |

OTHER PUBLICATIONS

Patent Cooperation Treaty (PCT) International Search Report and Written Opinion issued in co-pending PCT International Patent Application No. PCT/2012/052638 (International Filing Date: Aug. 28, 2012) having a Date of Mailing of Nov. 22, 2012 (12 pgs).

* cited by examiner

*Primary Examiner* — Nadeem Iqbal

(57) ABSTRACT

Systems, methods, and other embodiments associated with optimizing the use of replaceable memory cards and onboard memory as storage for data in cache are described. According to one embodiment, an apparatus includes a cache space manager configured to cause a cache processor to store data of a removable memory card of a memory device to an onboard memory of the memory device. The apparatus also includes an error rate monitor configured to monitor operating parameters of the removable memory card and to activate a cache processor to store the data from the removable memory card to the onboard memory when the operating parameters meet predetermined criteria.

19 Claims, 5 Drawing Sheets

US 8,887,005 B2

CACHING SYSTEM WITH REMOVABLE MEMORY CARD

CROSS REFERENCE TO RELATED APPLICATIONS

This patent disclosure claims the benefit of U.S. Provisional Application No. 61/534,683 filed on Sep. 14, 2011, which is wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A computing system typically has a hard disk drive (HDD) and a solid state drive (SSD) that operates as a cache. A cache controller transfers data between the HDD and the SSD. The SSD caches contents of the HDD to safeguard the HDD contents in the event of power loss.

The SSD is typically a single level cell (SLC) type memory, a type of flash memory that stores a bit of data in a cell. However, SLCs may be cost prohibitive for use in cache. To offset the cost of SLCs, external or removable memory cards such as multi-level cells (MLCs) may be employed. MLCs are a flash memory capable of storing more than a single bit of information in a cell. However, MLCs have a short life and are prone to early failure due to continuous writing. The cached contents of the removable memory are lost when the removable memory fails.

SUMMARY

In one embodiment an apparatus includes a cache space manager configured to cause a cache processor to store data of a removable memory card of a memory device to an onboard memory of the memory device. The apparatus also includes an error rate monitor configured to monitor operating parameters of the removable memory card and to activate a cache processor to store the data from the removable memory card to the onboard memory when the operating parameters meet predetermined criteria.

In one embodiment, a portion of the onboard memory is reserved to store the data from the removable memory card. In one embodiment, the cache space manager is configured to use an eviction policy to evict data from the removable memory card prior to storing data from the removable memory card to the onboard memory.

In another embodiment, a method includes receiving a card replacement signal from a monitor monitoring operating parameters of a removable memory card storing the data of the removable memory card in a memory different from the removable memory card. In one embodiment of them method the card replacement signal is generated in the event of an occurrence of i) a certain number of errors, ii) a type of error, iii) a predetermined error rate, iv) a passage of a predetermined amount of time since the removable memory card was installed, v) an event on a replacement schedule, or vi) a predetermined number of writes to the removable memory card. In one embodiment, the method includes rewriting a cache tag used to identify the data in the removable memory to indicate that the data is stored in the memory.

In one embodiment a caching system includes a cache; a cache processor; and at least one socket configured to place a removable memory card in communication with the cache processor. The system also includes a cache replacement logic configured to cause the cache processor to store data stored on the removable memory card to the cache while the removable memory card is being replaced.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. In some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are examples of systems, methods, and other embodiments associated with optimizing the use of replaceable memory cards and onboard memory as storage for data in cache. Specifically, the embodiments herein balance use of removable memory (e.g., MLC) that is easily replaceable and cost effective with the more expensive but stable onboard memory (e.g., SLC) being used as a rescue cache that stores contents of a removable memory card while it is being replaced. The removable memory card is used as the cache. At least a portion of the onboard memory is reserved to store the data of a removable memory card in the event that the removable memory card begins to fail.

Figure 1:
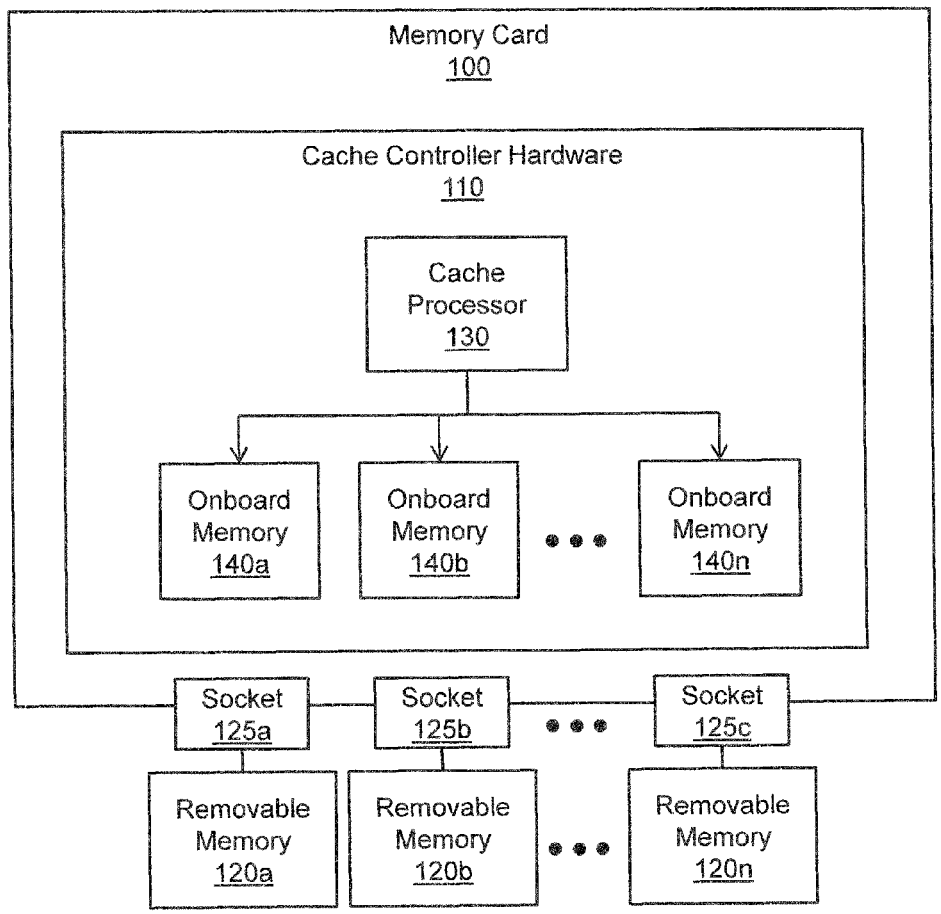
FIG. 1 illustrates one embodiment of a memory card that is associated with optimizing the use of removable memory as storage cache and onboard memory as a rescue cache.

With reference to FIG. 1, one embodiment of a memory card 100 is shown that is associated with optimizing use of removable memory cards for caching by providing onboard memory as a rescue cache. The rescue cache is used to store data from a removable memory card while the removable memory is replaced. The memory card 100 may be implemented in a digital device (e.g., computer, camera, printer). The memory card 100 includes a cache controller 110 to manage distribution of cached data. The memory card 100 is electrically connected to removable memory 120a, 120b, to 120n. The external memories 120a, 120b, to 120n are called pluggable memory cards because the external memories 120a, 120b, to 120n are designed to be plugged into sockets in the memory card 110.

The external memories 120a, 120b, to 120n are plugged into sockets 125a, 125b, to 125n respectively. A replacement memory card is addressed by the memory card based on the socket it is plugged into. For example if a new memory card is plugged into socket 125a, the new memory card becomes, from the perspective of the cache controller 110, the removable memory 120a because the new removable memory card has the same addresses as the memory card it replaced 120a. Thus, the external memories 120a, 120b, to 120n are pluggable, and a user can access a memory card, remove the memory card, and replace the memory card and the system will still function in the same manner that the system did prior to the replacement.

The cache controller 110 also includes a cache processor 130 and onboard memories 140a, 140b, to 140n. The cache controller 110 manages the distribution of the cached data between the external memories 120a, 120b, to 120n and onboard memories 140a, 140b, to 140n. The cache processor 130 writes the data between the external memories 120a, 120b, to 120n and onboard memories 140a, 140b, to 140n.

When data is cached by the memory card 100, the data is written to one or more of the external memories 120a, 120b, to 120n by the cache processor 130. In the event that a removable memory begins to fail, the data stored on the failing removable memory is written to one or more of the onboard memories 140a, 140b, or 140n. For example, data is written to the removable memory 120a for caching. When the removable memory 120a begins to fail, the cache manager 110 designates the onboard memory 140a as a rescue cache to store the data currently cached on the removable memory 120a. The cache processor 130 writes the data stored on the removable memory 120a to the onboard memory 140a. While onboard memories 140a, 140b, to 140n are illustrated as being a part of the memory card 100, the onboard memories may also be remote with respect to the memory card (e.g., a server, external memory card, cloud storage device).

Figure 2:
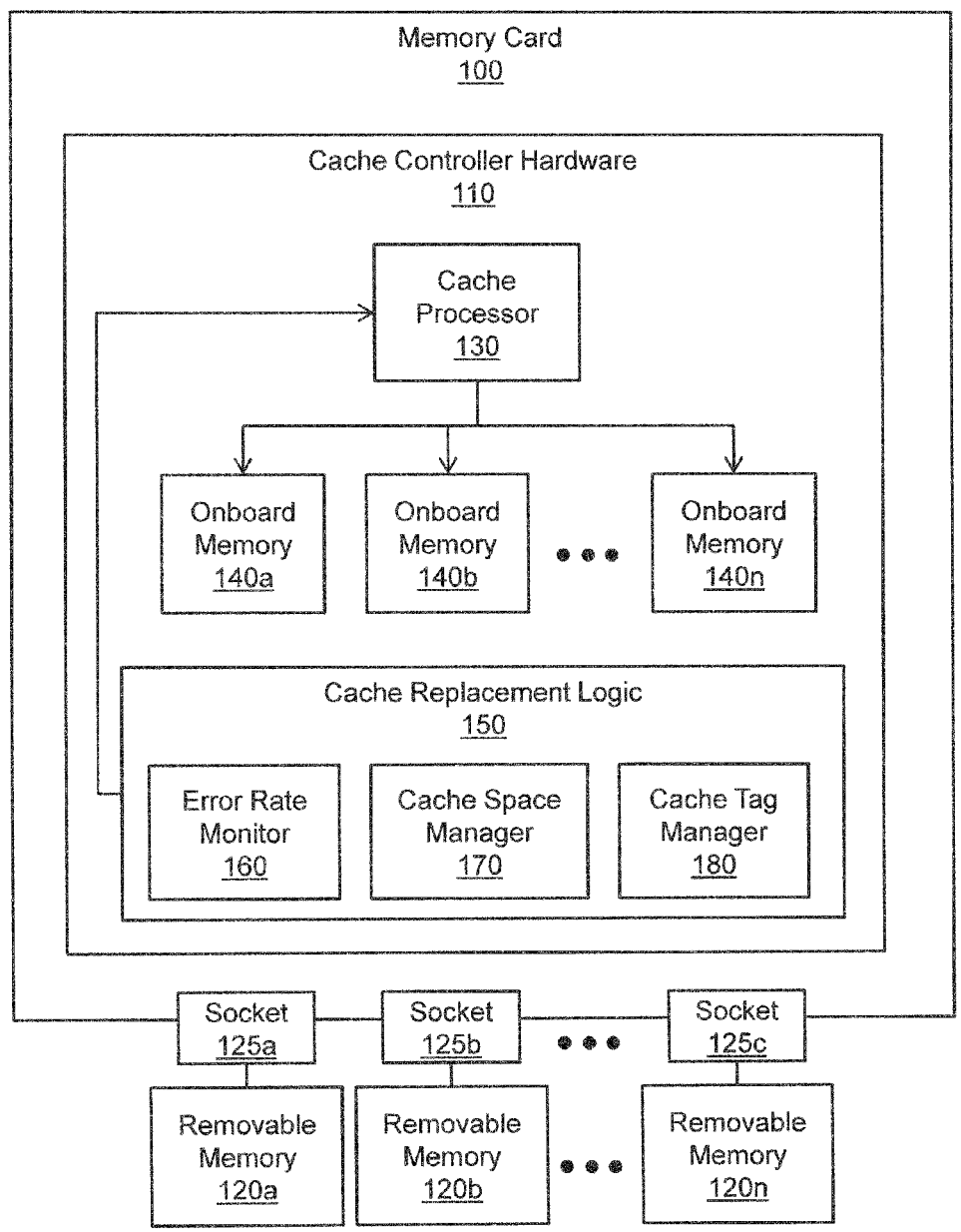
FIG. 2 illustrates one embodiment of a memory card that is associated with optimizing the use of removable memory as storage cache and onboard memory as a rescue cache.

With reference to FIG. 2, one embodiment of a memory card 100 is shown that is associated with optimizing the use of the external memories 120a, 120b, to 120n as storage cache and the onboard memories 140a, 140b, to 140n as a rescue cache. FIG. 2 includes similar features as those shown in FIG. 1, which are assigned the same reference characters. The cache controller 110 includes a cache replacement logic 150 that facilitates the temporary storage of the data from a failing removable memory card to a rescue cache. The cache replacement logic 150 includes an error rate monitor 160, a cache space manager 170, and a cache tag manager 180.

The error rate monitor 160 determines if a removable memory is ready to be replaced. A removable memory is ready to be replaced when it is in the process of failing or has functioned beyond its reliable lifespan. Several techniques may be employed by the error rate monitor to determine if a removable memory card is ready to be replaced. In one embodiment, the error rate monitor 160 checks for write errors (e.g., block errors) when the data is written to the removable memory cards. Increased write errors are an indication that the removable memory is failing. When the errors reach a predetermined level (e.g., a certain number of errors, a type of error, an error rate) the error rate monitor 160 sends a signal to the cache replacement logic 150 to indicate that the particular removable memory is ready to be replaced.

Alternatively, the error rate monitor 160 may monitor the passage of time since the removable memory card was installed. For example, an external memories 120a, 120b, or 120n may be ready to be replaced after a predetermined amount of time (e.g., daily, weekly, monthly). Thus, the error rate monitor 160 may send a signal to the cache replacement logic 150 when the predetermined time has elapsed. The external memories 120a, 120b, or 120n may be kept on a staggered replacement schedule to reduce the likelihood that more than one removable memory will need to be replaced at the same time.

The error rate monitor 160 may also count the number of writes occurring on a removable memory 120a, 120b, or 120n. For example, a removable memory may be ready to replaced after a predetermined number (e.g., 1,000, 10,000, 100,000) of writes. Thus, the error rate monitor 160 may send a signal to the cache replacement logic 150 when the predetermined number of writes has occurred to the removable memory.

When the error rate monitor 160 indicates that a removable memory 120a, 120b, or 120n is ready to be replaced, the data cached on the removable memory to be written to the rescue cache in an onboard memory 140a, 140b, or 140n. For example, if the error rate monitor 160 detects that the removable memory 120a suffers from a threshold number of write errors, the cache space manager 170 allocates memory in a rescue cache in the onboard memory 140a to store the data currently written to the removable memory 120a.

In some embodiments, the amount of memory allocated to the rescue cache in onboard memory is less than the capacity of one of the external memories. The cache space manager 170 selects data from the removable memory being replaced for storage in the rescue cache. The cache space manager 170 uses an eviction policy to evict data from the onboard memory prior to storing data in the rescue cache. The eviction policy may be based on the amount of time data has been stored in the cache, which data is least used, or any other suitable eviction policy. Alternatively, the cache space manager 170 may remove data from the onboard memories 140a, 140b, and 140n when space is needed to store data from external memories 120a, 120b, or 120n.

The data is identified in the external memories 120a, 120b, and 120n as well as onboard memories 140a, 140b, and 140n using cache lookup tags. The cache tag manager 180 assigns and manages cache lookup tags. When data is stored in a removable memory 120a, 120b, or 120n, the cache tag manager 180 assigns the data a cache tag corresponding to its cache location so that the data can be located. The cache tag is a unique identifier such as an alphanumeric, address, or flag.

The cache tags correspond to entries in a cache table. When data is stored in a removable memory 120a, 120b, or 120n, the cache tag indicates which removable memory the data is stored in. For example, the cache table may indicate that a specific portion of data is stored in removable memory 120a. The cache tag may further indicate where in the removable memory 120a the portion of data is stored.

When the error rate monitor 160 indicates that a removable memory 120a, 120b, or 120n is ready to be replaced, the data being stored in the removable memory is identified by the cache tags of the data. The cache space manager 170 assigns the identified cache tags of the data to an onboard memory 140a, 140b, or 140n. The cache processor 130 writes the data having the identified cache tags to the onboard memory 140a, 140b, or 140n. The cache tag manager 180 rewrites the cache tag corresponding to the data to reflect that the data is stored in the onboard memory 140a, 140b, or 140n by designating which onboard memory the data is stored on.

Figure 3:
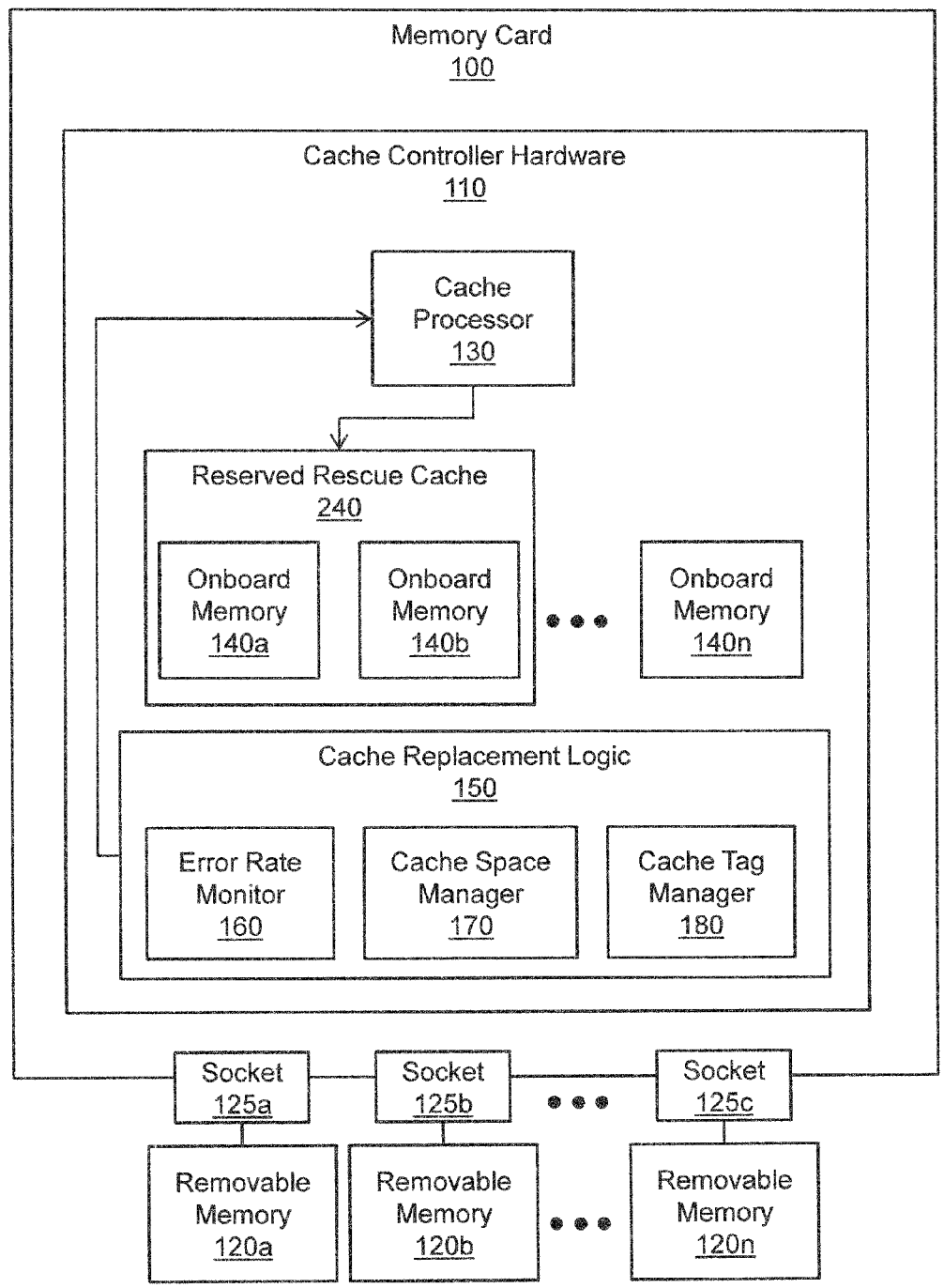
FIG. 3 illustrates one embodiment of a memory card that is associated with optimizing the use of removable memory as storage cache and onboard memory as a rescue cache.

With reference to FIG. 3, one embodiment of a memory card 100 is shown that is associated with optimizing the use of the external memories 120a, 120b, to 120n as storage cache and the onboard memories 140a, 140b, to 140n as the rescue cache. FIG. 3 includes similar features as those shown in FIG.

1, which are assigned the same reference characters. To ensure that there will be onboard memory available to store the data cached to the external memories 120a, 120b, or 120n, a portion of the onboard memory may be reserved for use as a reserved rescue cache 240.

The memory card 100 uses the onboard memories 140a, 140b, to 140n as storage media. However, to ensure that there is onboard memory available to store the data cached in the external memories 120a, 120b, to 120n a portion of the onboard memory, here 140a and 140b, are reserved as a rescue cache 240. The reserved rescue cache 240 is not written to unless one the external memories 120a, 120b, to 120n begins to fail. Accordingly, onboard memory corresponding to the reserved rescue cache 240 is allocated by the cache space manager 170.

Figure 4:
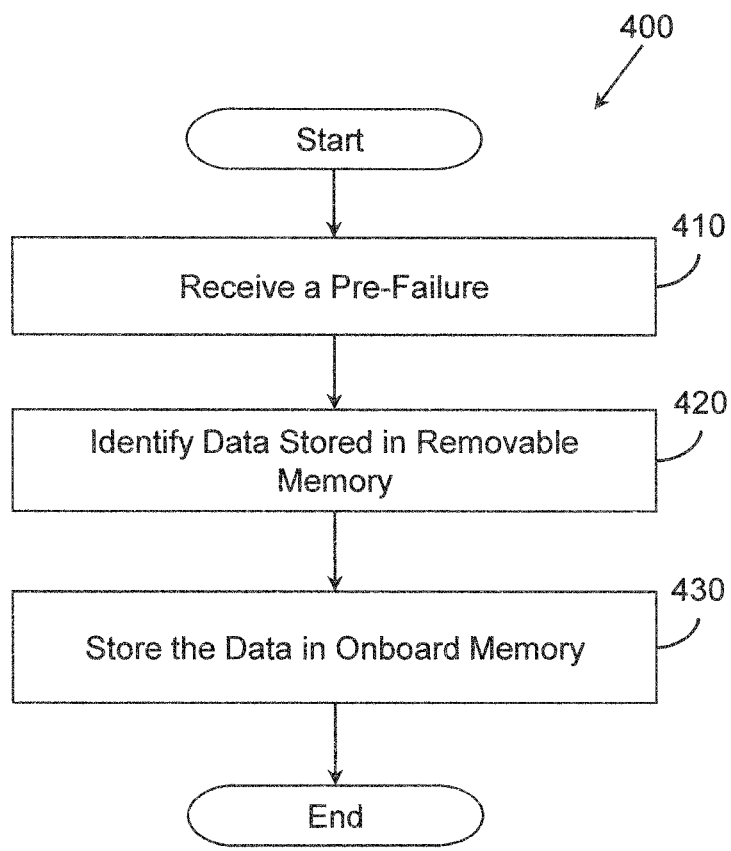
FIG. 4 illustrates one embodiment of a method associated with optimizing the use of removable memory as storage cache and onboard memory as a rescue cache.

FIG. 4 illustrates one embodiment of a method associated with optimizing the use of a removable memory as storage cache and onboard memory as a rescue cache. At 410, the method includes receiving a replacement signal from an error rate monitor. The replacement signal indicates anticipation of failure or end of lifespan of a removable memory card. The replacement signal is received in the event of a certain number of errors, a type of error, an occurrence of a predetermined error rate, a predetermined amount of time since the removable memory card was installed, or the occurrence of a predetermined number of writes to the removable memory card.

At 420, the method includes identifying data stored in the removable memory card. At 430, the data of the removable memory card is stored in an onboard memory. To facilitate storage of the data, cache tags associated with the data stored in the removable memory card are changed to indicate that the data is now stored in onboard memory. Accordingly, the data can be identified in the on board memory.

Figure 5:
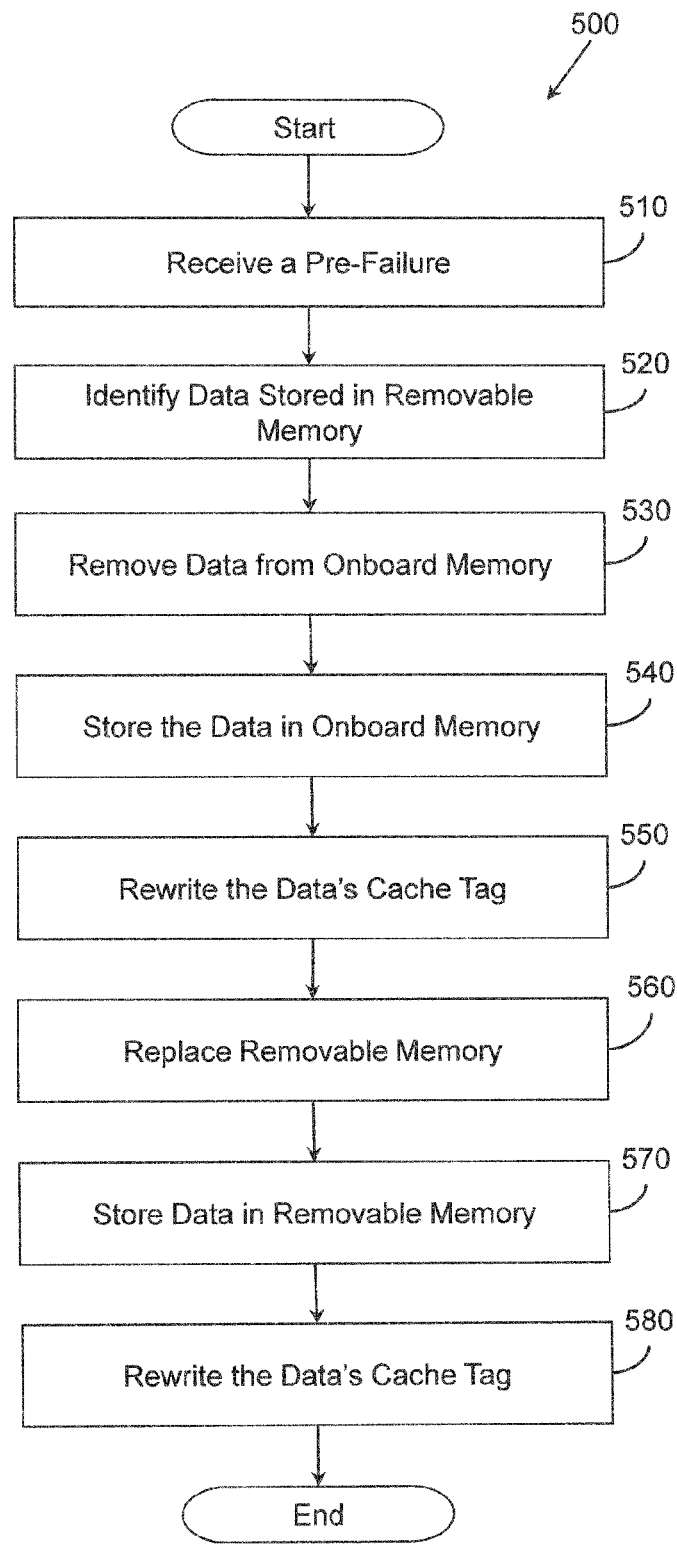
FIG. 5 illustrates one embodiment of a method associated with optimizing the use of removable memory as storage cache and onboard memory as a rescue cache.

FIG. 5 illustrates one embodiment of a method associated with optimizing the use of removable memory as storage cache and onboard memory as a rescue cache. At 510, the method includes receiving a replacement signal from an error rate monitor. The replacement signal indicates anticipation of failure or end of lifespan of a removable memory card. At 520, the method includes identifying data stored in the removable memory card. The data is identified using a corresponding cache tag. The cache tag indicates where in the removable memory the data is stored.

At 530, in one embodiment, some of the data in the removable memory is evicted prior to transferring the contents of the removable memory to the onboard memory. The data is removed from the removable memory using an eviction strategy. For example, the data that is accessed the least may be removed from the removable memory or the data that has been longest stored in the removable memory may be removed. At 540, the data of the removable memory card is stored in an onboard memory. At 550, the cache tag used to identify the data in the removable memory is rewritten to indicate that the data is now stored in the onboard memory. Accordingly, the data can be located in the on board memory.

At 560, the removable memory card is replaced with a different removable memory card. The different removable memory card takes on the characteristics of the previous removable memory card. Because the data of the previous removable memory card has been stored to onboard memory, the system does not have to be shut down to replace the removable memory card. Accordingly, the cache is composed of hot pluggable memory cards.

At 570, once the removable memory card has been replaced, the data stored in the onboard memory can be moved back to the removable memory card. Accordingly, the data stored in the onboard memory at 540, is written back to the removable memory. The data can then be removed (e.g., deleted) from the onboard memory. At 580 the cache tag used to identify the data in the onboard memory is rewritten to indicate that the data is now stored on the removable memory card. Accordingly, the data can be identified as being stored in the same removable memory card location as the data was prior to the replacement.

By employing the apparatus and methods described herein, a cache may be created from "hot pluggable" removable memory cards. The removable memory card can be replaced while the cache system is operating. The data is moved to onboard memory while the removable memory card is being replaced. Accordingly, a removable memory card can be replaced when it is about to fail with a new removable memory card. The removable memory cards can be replaced on a staggered schedule to reduce the amount of external storage that is lost when replacing removable memory cards.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus comprising:
a cache space manager configured to cause a cache processor to store data of a removable memory card of a memory device to an onboard memory of the memory device and evict the data from the removable memory card according to an eviction policy prior to storing the data from the removable memory card to the onboard memory; and
an error rate monitor configured to monitor operating parameters of the removable memory card and to activate the cache processor to store the data from the removable memory card to the onboard memory when the operating parameters meet predetermined criteria and cause the cache space manager to evict the data from the removable memory card according to the eviction policy.

2. The apparatus of claim 1, wherein a portion of the onboard memory is reserved to store the data from the removable memory card.

3. The apparatus of claim 1, wherein the eviction policy is based, at least in part, on an amount of time that data has been stored in the cache or how often the data is used.

4. The apparatus of claim 1, further comprising a cache tag manager configured to modify cache tags associated with data stored in the removable memory card to indicate that the data is stored in the onboard memory.

5. The apparatus of claim 1, wherein the operating parameters are one of i) a number of errors, ii) a type of error, iii) an error rate, iv) amount of time passed since the removable memory card was installed, v) events on a replacement schedule, or vi) a number of writes to the removable memory card.

6. The apparatus of claim 1, wherein the removable memory is a multi-level cell memory and the onboard memory is a single level cell memory.

7. A method, comprising:
receiving a card replacement signal from a monitor monitoring operating parameters of a removable memory card, wherein the replacement signal is generated in response to an occurrence of an error threshold event;
in response to the generated replacement signal, storing the data of the removable memory card in an onboard memory different from the removable memory card;
replacing the removable memory card with a new removable memory card; and
storing the data stored in the memory to the new removable memory card.

8. The method of claim 7, where the onboard memory of a memory device in which the removable memory card is installed.

9. The method of claim 7, wherein the error threshold event is one of i) a certain number of errors, ii) a type of error, iii) a predetermined error rate, iv) a passage of a predetermined amount of time since the removable memory card was installed, v) an event on a replacement schedule, or vi) a predetermined number of writes to the removable memory card.

10. The method of claim 8, further comprising rewriting a cache tag used to identify the data in the removable memory to indicate that the data is stored in the memory.

11. The method of claim 7, further comprising rewriting the cache tag used to identify the data in the memory to indicate that the data is stored in the new removable memory.

12. A caching system, comprising:
a cache;
a cache processor;
at least one socket configured to place a removable memory card in communication with the cache processor;
a cache replacement logic configured to cause the cache processor to store data stored on the removable memory card to the cache while the removable memory card is being replaced;
a cache space manager configured to use an eviction policy to evict data from the removable memory card prior to storing data from the removable memory card to the cache; and
an error rate monitor configured to monitor operating parameters of the removable memory card installed in the at least one socket and to activate the cache replacement logic and the cache space manager when the operating parameters meet predetermined criteria.

13. The caching system of claim 12, wherein the operating parameters monitored by the error rate monitor include at least one of an occurrence of i) a certain number of errors, i) a type of error, iii) a predetermined error rate, iv) a passage of a predetermined amount of time since the removable memory card was installed, v) an event on a replacement schedule, or vi) a predetermined number of writes to the removable memory card.

14. The caching system of claim 12, wherein the cache is onboard memory of the caching system.

15. The caching system of claim 12, wherein the cache is a removable memory card.

16. The caching system of claim 12, further comprising a cache space manager configured to use an eviction policy to evict data from the removable memory card prior to storing data from the removable memory card to the cache.

17. The caching system of claim 12, wherein one or both of the removable memory card and the cache is a multi-level cell memory.

18. The caching system of claim 12, wherein one or both of the removable memory card and the cache is a single level cell memory.

19. The caching system of claim 12, wherein the eviction policy causes the data to be evicted based, at least in part, on an amount of time that data has been stored in the cache or how often the data is used.

* * * * *